US011567795B2

(12) United States Patent
Cortez et al.

(10) Patent No.: US 11,567,795 B2
(45) Date of Patent: *Jan. 31, 2023

(54) MINIMIZING IMPACT OF MIGRATING VIRTUAL SERVICES

(71) Applicant: Microsoft Technology Licensing, LLC, Redmond, WA (US)

(72) Inventors: Eli Cortez, Woodinville, WA (US); Ajay Mani, Woodinville, WA (US); Marcus Felipe Fontoura, Medina, WA (US); Nisarg Tarakkumar Sheth, Bothell, WA (US); Thomas Moscibroda, Bellevue, WA (US); Ana-Maria Constantin, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/217,803

(22) Filed: Mar. 30, 2021

(65) Prior Publication Data

US 2021/0216355 A1 Jul. 15, 2021

Related U.S. Application Data

(63) Continuation of application No. 16/160,756, filed on Oct. 15, 2018, now Pat. No. 10,977,068.

(51) Int. Cl.
*G06F 9/455* (2018.01)
*G06N 5/02* (2006.01)
*H04L 67/10* (2022.01)

(52) U.S. Cl.
CPC .......... *G06F 9/45558* (2013.01); *G06N 5/02* (2013.01); *H04L 67/10* (2013.01); *G06F 2009/4557* (2013.01); *G06F 2009/45595* (2013.01)

(58) Field of Classification Search
USPC ............................................. 718/1
See application file for complete search history.

(56) References Cited

U.S. PATENT DOCUMENTS 9,612,765 B2 * 4/2017 Huang .................... H04L 41/12
10,509,667 B1 * 12/2019 Popuri ............... G06F 9/45558
(Continued)

OTHER PUBLICATIONS

Verma et al.; "CosMig: Modeling the Impact of Reconfiguration in a Cloud," 2011 IEEE 19th Annual International Symposium on Modelling, Analysis, and Simulation of Computer and Telecommunication Systems (pp. 3-11); 2011 (Year: 2011).*

(Continued)

*Primary Examiner* — Wei Y Zhen
*Assistant Examiner* — Clint Thatcher
(74) *Attorney, Agent, or Firm* — Ray Quinney & Nebeker P.C; James Bullough

(57) ABSTRACT

The present disclosure relates to systems, methods, and computer readable media that utilize a low-impact live-migration system to reduce unfavorable impacts caused as a result of live-migrating computing containers between physical server devices of a cloud computing system. For example, systems disclosed herein evaluates characteristics of computing containers on server devices to determine a predicted unfavorable impact of live-migrating the computing containers between the server devices. Based on the predicted impact, the systems disclosed herein can selectively identify which computing containers to live-migrate as well as carry out live-migration of the select computing containers in such a way the significantly reduces unfavorable impacts to a customer or client device associated with the computing containers.

18 Claims, 9 Drawing Sheets

(56) References Cited

U.S. PATENT DOCUMENTS

| | | | | |
|---|---|---|---|---|
| 10,564,998 B1* | 2/2020 | Gritter | ............... | G06F 9/5083 |
| 2013/0185420 A1* | 7/2013 | Shimogawa | ....... | H04L 12/4645 |
| | | | | 709/224 |
| 2013/0346613 A1* | 12/2013 | Tarasuk-Levin | ...... | G06F 9/4856 |
| | | | | 709/226 |
| 2015/0205638 A1* | 7/2015 | Motoki | ............... | G06F 9/4856 |
| | | | | 711/162 |
| 2015/0324236 A1* | 11/2015 | Gopalan | ............. | G06F 3/0619 |
| | | | | 711/162 |
| 2015/0370596 A1* | 12/2015 | Fahs | ..................... | G06F 9/4856 |
| | | | | 718/1 |
| 2015/0378766 A1* | 12/2015 | Beveridge | ........... | G06F 9/45558 |
| | | | | 718/1 |
| 2016/0139946 A1* | 5/2016 | Gardner | ............... | G06F 9/5077 |
| | | | | 718/1 |
| 2017/0060627 A1* | 3/2017 | Birkestrand | ......... | G06F 9/5033 |
| 2017/0139732 A1* | 5/2017 | Cropper | ............... | G06F 9/4856 |
| 2017/0199770 A1* | 7/2017 | Peteva | ................. | G06F 9/5088 |
| 2017/0230306 A1* | 8/2017 | Cropper | ............... | H04M 15/00 |
| 2018/0129523 A1* | 5/2018 | Bryant | ................. | G06F 9/4856 |
| 2018/0246751 A1* | 8/2018 | Dong | .................. | G06F 9/45558 |
| 2019/0306236 A1* | 10/2019 | Wiener | .................. | H04L 43/08 |
| 2020/0117494 A1* | 4/2020 | Cortez | ................. | G06F 9/4856 |

OTHER PUBLICATIONS

Zhang et al.; "A Survey on Virtual Machine Migration: Challenges, Techniques, and Open Issues," in IEEE Communications Surveys & Tutorials, vol. 20, No. 2, (pp. 1206-1243); Jan. 17, 2018 (Year: 2018).*

Kapil et al.; "Live virtual machine migration techniques: Survey and research challenges," 2013 3rd IEEE International Advance Computing Conference (IACC)(pp. 963-969); 2013 (Year: 2013).*

Chen et al.; "A Live Migration Algorithm for Virtual Machine in a Cloud Computing Environment"; 2015 UIC-ATC-ScalCom, pp. 1319-1326; 2015 (Year: 2015).*

* cited by examiner

MINIMIZING IMPACT OF MIGRATING VIRTUAL SERVICES

CROSS-REFERENCE TO RELATED APPLICATIONS

This application is a Continuation of U.S. patent application Ser. No. 16/160,756, filed on Oct. 14, 2018, the entirety of which is incorporated herein by reference.

BACKGROUND

A cloud computing system refers to a collection of computing devices on which data can be remotely stored and accessed. For example, modern cloud computing infrastructures often include a collection of physical server devices organized in a hierarchical structure including computing zones, clusters, virtual local area networks (VLANs), racks, fault domains, etc. Cloud computing systems often make use of different types of virtual services (e.g., computing containers, virtual machines) that provide remote storage and computing functionality to various clients or customers. These virtual services can be hosted by respective server nodes on a cloud computing system.

As cloud computing systems have grown in popularity and increased in complexity, managing different types of services and structures across a distributed network of computing devices has become increasingly difficult. Indeed, many conventional cloud computing systems enhance storage space and processing capabilities of distributed computing devices by live-migrating computing containers, virtual machines, or other virtual services from one server node to another server node within the cloud computing system. Live-migrating virtual services can occur under a variety of circumstances including, by way of example, emptying a server node for an operating system (OS) update, balancing storage capacity between server nodes to make room for more allocatable capacity across multiple server nodes, and avoiding disconnection from computing structures as a result of predicted server failure.

DETAILED DESCRIPTION

Figure 1:
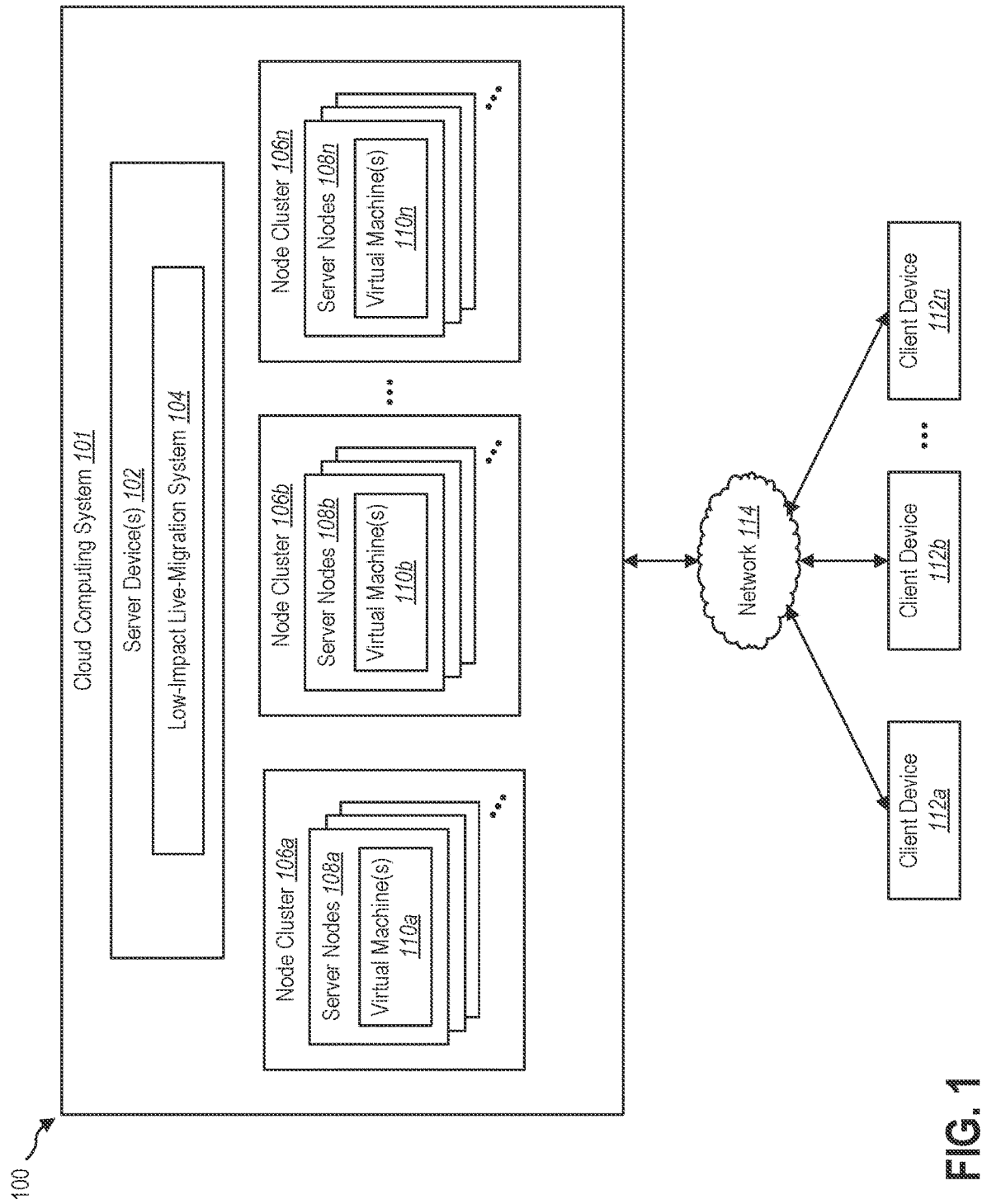
FIG. 1 illustrates an example environment of a network of a distributed computing system including a low-impact live-migration system in accordance with one or more implementations.

The present disclosure is generally related to a low-impact live-migration system implemented on a cloud computing system (e.g., distributed network of computing devices) that minimizes unfavorable impacts caused by live-migrating virtual machines, virtual computing containers (or simply "computing containers"), or other virtual services between server devices (e.g., server nodes) of the cloud computing system. In particular, as will be described in further detail below, the low-impact live-migration system evaluates characteristics of a plurality of virtual services on one or more server devices to determine a predicted unfavorable impact of live-migrating the virtual services between server devices. Based on the predicted impact of live-migrating the respective services, the low-impact live-migration system can selectively identify one or more computing containers and/or virtual machines to live-migrate as well as schedule a time for live-migration based on the predicted impact associated with live-migrating the respective virtual service(s) at a specific time. In addition, the low-impact live-migration system can initiate live-migration of the select services in accordance with one or more implementations described herein.

Implementations of the present disclosure provide benefits and/or solve one or more problems associated with live-migrating computing containers and/or virtual machines between server devices of a cloud computing system. In particular, live-migrating containers and virtual machines between server devices often unfavorably impacts customer services and/or connections between client devices and the computing containers or virtual machines. In addition, live-migrating often causes blackouts, brownouts, or other interruptions that negatively impact a service or connection between a client device and the cloud computing system. As a result, clients can become frustrated as applications slow, operate at reduced throughput or increased latency, or become temporarily disconnected from the cloud computing system while computing containers or virtual machines that provide the various applications are live-migrated between server nodes.

As will be described in further detail below, the low-impact live-migration system can avoid many of the unfavorable impacts commonly caused by live-migration in a variety of ways. For example, by evaluating characteristics of different virtual services, the low-impact live-migration system can distinguish between computing containers or virtual machines that may have different levels of sensitivity to live-migration. For instance, a virtual machine for an online gaming application may have a high sensitivity to live-migration where even a short blackout (e.g., 1-2 seconds) or brownout causes the client device to disconnect from an active game. Alternatively, a virtual machine that provides large-scale computing applications may have a higher tolerance to a short blackout or brownout, ultimately having a very small impact from the perspective of a customer.

In addition to live-migration sensitivity, the low-impact live-migration system can further identify other characteristics of computing containers and virtual machines related to a potential impact of performing live-migration at a particular time. For example, the low-impact live-migration system can identify usage patterns associated with a virtual machine to determine a time of day that live-migrating the virtual machine may have a higher or lower impact on a customer. As another example, the low-impact live-migration system can determine a size or input/output (I/O) activity of the virtual machine and how live-migration may impact providing service to a client device while moving containers between server devices. As a further example, the low-impact live-migration system can identify a projected lifetime of a virtual machine to determine whether the virtual machine is set to expire or discontinue operation in the near future. Indeed, the low-impact live-migration system can identify any number of computing container or virtual machine characteristics that may influence an impact of live-migrating a virtual service from one device to another.

Based on the identified computing container or virtual machine characteristics, the low-impact live-migration system can apply or otherwise implement a prediction engine trained to determine a projected impact of performing live-migration. In particular, as will be described in further detail below, the low-impact live-migration system can apply the prediction engine to any number of computing containers and/or virtual machines to determine impact scores associated with a projected impact of live-migrating one or more of the virtual service(s) between devices on the cloud computing system. The prediction engine can be used to determine a migration impact in a variety of ways, examples of which will be described in further detail below.

Based on the determined impact of live-migrating the computing containers, the low-impact live-migration system can selectively identify computing containers and/or virtual machines for live-migration. In particular, the low-impact live-migration system can identify a subset of computing containers or virtual machines from a larger collection of virtual services having lower impact scores and initiate live-migration of the identified subset. In this way, the low-impact live-migration system can selectively identify those virtual services that will have a lower impact on customers, which can significantly decrease and even avoid some of the negative effects of live-migrating computing containers indiscriminately (e.g., without considering timing of live-migration or various container characteristics).

The low-impact live-migration system provides a number of advantages over conventional systems for live-migrating services between server nodes. In particular, the low-impact live-migration system can selectively live-migrate one or more computing containers or virtual machines to improve overall performance and storage capacity of the distributed computing system. As an example, the low-impact live-migration system can trigger live-migrating one or more virtual machines in order to maintain a desired number of empty server nodes on a cluster of server nodes. Indeed, by maintaining a certain number (e.g., a threshold minimum or desired number) of empty server nodes, the low-impact live-migration system can increase flexibility of a cluster of server devices, improve fault tolerance, as well as increase a quantity of allocatable computing space on a cluster of server nodes.

In addition, the low-impact live-migration system can trigger live-migration to improve performance of the cloud computing system in other ways. For example, the low-impact live-migration system can trigger live-migration to de-fragment capacity of one or more server devices, thereby increasing allocatable space across a cluster of server devices. As another example, the low-impact live-migration system can predict failure of a server node and generate a migration schedule that timely live-migrates virtual machines on the server node prior to failure while minimizing an unfavorable impact of the live-migration. As a further example, the low-impact live-migration system can live-migrate virtual machines from a server device to enact an OS update without interrupting a connection to the virtual machines on the server device while updating the OS.

As illustrated in the foregoing discussion, the present disclosure utilizes a variety of terms to describe features and advantages of the low-impact live-migration system. Additional detail is now provided regarding the meaning of such terms. For instance, as user herein, a "cloud computing system" refers to a network of connected computing devices that provide various services to client devices. For instance, as mentioned above, a distributed computing system can include a collection of physical server devices (e.g., server nodes) organized in a hierarchical structure including computing zones, clusters, virtual local area networks (VLANs), racks, fault domains, etc. In addition, it will be understood that while one or more specific examples and implementations described herein relate specifically to "clusters" of server nodes, features and functionality described in connection with one or more node clusters described herein can similarly relate to racks, fault domains, or other hierarchical structures of physical server devices. The cloud computing system may refer to a private or public cloud computing system.

As used herein, a "virtual service" refers to a service provided by a cloud computing system. A virtual service may provide an operating system, which As used herein, a "computing container" or "virtual computing container" refers to a virtual service or layer on a server node of a cloud computing system that provides access to a storage space and/or software application hosted by the cloud computing system. Computing containers can provide services to any number of containerized applications on a cloud computing system.

As used herein, a "virtual machine" refers to an emulation of a computer system on a server node that provides functionality of one or more applications on the cloud computing system. Virtual machines can provide functionality needed to execute one or more operating systems. In addition, virtual machines can make use of hypervisors on processors of server devices that support virtual replication of hardware. It will be understood that while one or more specific examples and implementations described herein relate specifically to virtual machines, features and functionality described in connection with identifying virtual machine characteristics and live-migrating virtual machines can similarly apply to other types of computing containers.

As used herein, "live-migration" refers to a process whereby data from a server node is migrated to another server node (e.g., a destination server node). For example, live-migration may refer specifically to migrating a virtual machine from one device to another device while providing full or limited connectivity to a client device to the virtual machine. As mentioned above, live-migration may occur in a variety of ways and may be performed under various circumstances to improve storage capacity and functionality of a cloud computing system.

As used herein, "migration impact" or "impact" refer interchangeably to a predicted impact of accessing a computing container as a result of an interruption in connectivity between a client device and a virtual machine hosted by one or more server nodes. For example, an impact may refer to a metric that indicates a time or duration that a client device is disconnected from or experiences limited connectivity to an application provided by a virtual machine. In one or more embodiments, an impact is measured by an impact score that indicates a level of impact ranging from a low impact (e.g., a less noticeable impact to a customer) to a high impact (e.g., a more noticeable impact to a customer). In addition, as will be described in further detail below, an impact may vary based on a type of application, a size of a virtual machine, or other characteristics of a virtual machine in accordance with one or more embodiments described herein.

Additional detail will now be provided regarding the low-impact live-migration system in relation to illustrative figures portraying example implementations. For example, FIG. 1 illustrates an example environment 100 for managing live-migration of virtual machines between server nodes of a cloud computing system 101. As shown in FIG. 1, the environment 100 includes a cloud computing system 101. The cloud computing system 101 includes one or more server device(s) 102 including a low-impact live-migration system 104. The cloud computing system further includes a plurality of node clusters 106a-n. Each of the node clusters 106a-n include multiple server nodes 108a-n, which include one or more virtual machines 110a-n thereon. While FIG. 1 illustrates a specific arrangement of server device(s) 102, node clusters 106a-n, server nodes 108a-n, and virtual machines 110a-n, the cloud computing system 101 can include any number of node clusters (or other hierarchical structure of devices), which may include any number of server nodes, each of which may include zero, one, or multiple virtual machines, computing containers and/or other types of virtual services implemented thereon.

As further shown, the environment 100 includes a plurality of client devices 112a-n in communication with the cloud computing system 101 (e.g., in communication with different server nodes 108a-n) via a network 114. The client devices 112a-n may refer to various types of computing devices including, by way of example, mobile devices, desktop computers, or other types of computing devices. In addition, the network may include one or multiple networks that use one or more communication platforms or technologies for transmitting data. For example, the network 114 may include the Internet or other data link that enables transport of electronic data between respective client devices and devices of the cloud computing system 101.

In one or more implementations, the virtual machines 110a-n correspond to one or more customers and provide access to storage space and/or applications hosted by the server nodes 108a-n. For example, a virtual machine may provide access to a large-scale computation application to a client device 112a (or multiple client devices). As another example, a different virtual machine on the same server node or a different server node may provide access to a gaming application to a second client device 112b (or multiple client devices).

As will be described in further detail below, the low-impact live-migration system 104 can facilitate live-migration of one or more virtual machines 110a-n between server nodes 108a-n across the cloud computing system 101. As an example, the low-impact live-migration system 104 can live-migrate one or more virtual machines from a server node within a first node cluster 106a to another server node within the same node cluster 106a. Alternatively, the low-impact live-migration system 104 can live-migrate one or more virtual machines from a server node within the first node cluster 106a to another server node within a second node cluster 106b.

More specifically, the low-impact live-migration system 104 can facilitate live-migration of virtual machines between server nodes by selectively identifying virtual machines for live-migration as well as identifying a time of live-migration and a destination server node that avoids or otherwise reduces an impact of the live-migration to one or more of the client devices 112a-n having access to the virtual machine(s). As mentioned above, by selectively identifying virtual machines and strategically timing migration of the virtual machines between server nodes, the low-impact live-migration system 104 can significantly reduce connection and accessibility issues (e.g., different types of impact) that live-migrating the virtual machines can have on the client devices 112a-n.

Figure 2:
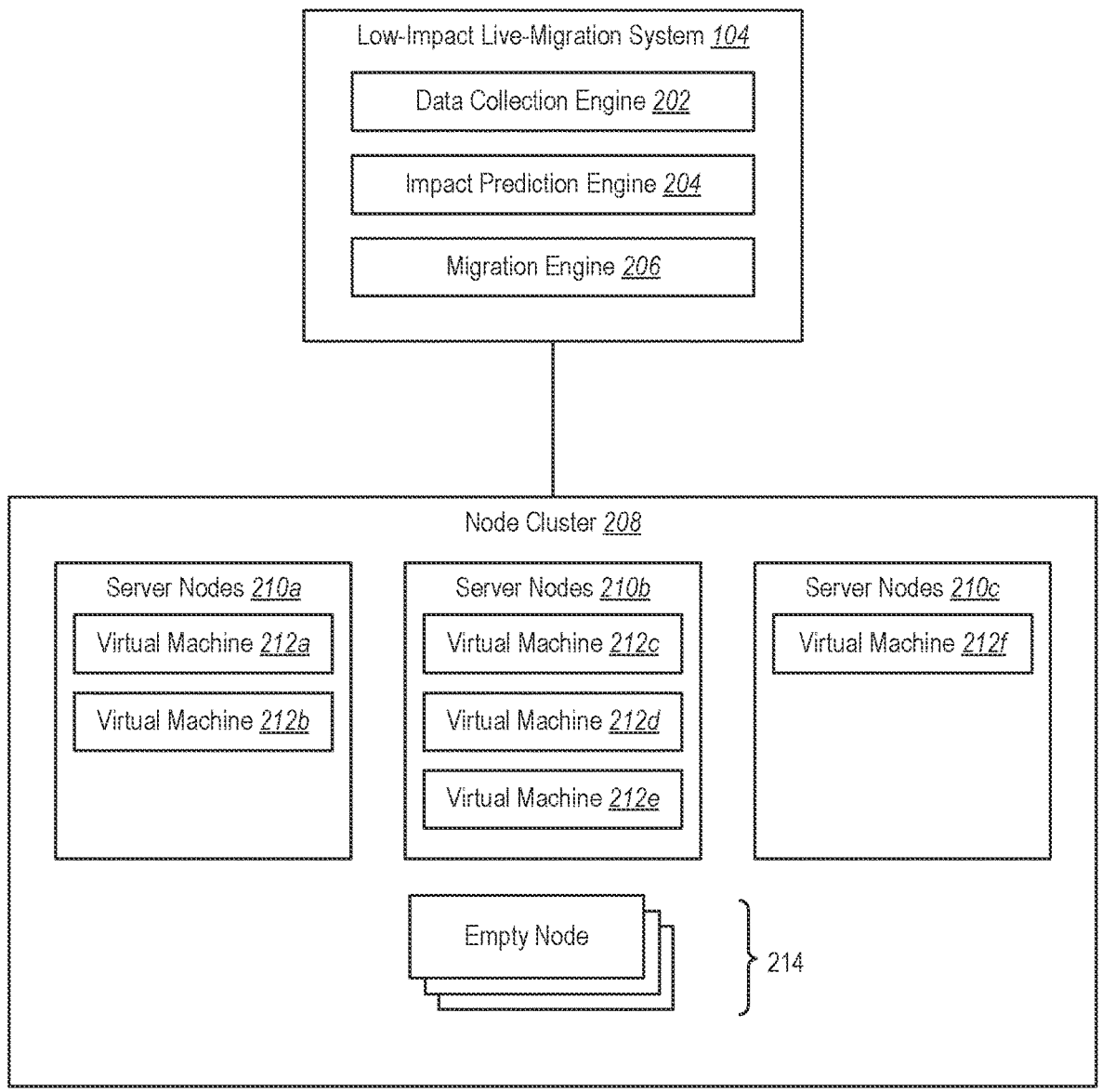
FIG. 2 illustrates an example low-impact live-migration system for migrating one or more virtual machines between server nodes of an example node cluster in accordance with one or more implementations.

Additional detail with regard to implementing live-migration of a virtual machine between server nodes within a node cluster will now be described in connection with FIG. 2. Similar features can similarly apply to live-migrating virtual machines between server nodes of different node clusters. As shown in FIG. 2, the low-impact live-migration system 104 may be implemented on a central resource device or system of devices to provide a number of features and functionalities described here. In particular, the low-impact live-migration system includes a data collection engine 202, an impact prediction engine 204, and a migration engine 206. As further shown, a node cluster 208 includes server nodes 210a-c including virtual machines 212a-f implemented thereon. The node cluster 208 additionally includes a number of empty nodes 214 that do not include one or more virtual machines operating thereon. The node cluster 208 may be an example of any of the node clusters 108a-n described in connection with FIG. 1.

While FIG. 2 illustrates an example arrangement of nodes including server nodes 210a-c including one or multiple virtual machines 212a-f thereon in addition to a number of empty nodes 214, the node cluster 208 may include any number of server nodes 210a-c, each of which may include one or multiple virtual machines. In addition, the node cluster 208 can include any number of empty nodes 214.

As mentioned above, the low-impact live-migration system 104 includes a data collection engine 202. The data collection engine 202 can collect, obtain, or otherwise access data associated with the virtual machines 212a-f. The data collection engine 202 may further identify any number of virtual machine characteristics associated with the virtual machines 212a-f. Virtual machine characteristics may include a number of different features or functionalities of a virtual machine in addition to characteristics of client devices and/or customer(s) associated with the virtual machine.

As an example, the data collection engine 202 can identify usage characteristics for a virtual machine. This may include a classification of time periods for which usage of the virtual machine is heavy or light. For example, a virtual machine that serves a number of devices used primarily for work purposes may experience heavy use during typical work hours while experiencing very light use at night or on weekends. Alternatively, a virtual machine that serves online gamers may experience heavy use during the evening, at night, or on weekends while experiencing lighter use during the morning, afternoon, or on weekdays. Similarly, virtual machines that serve clients across different time zones may have different usage characteristics for different ranges of time.

As another example, the data collection engine 202 can identify a lifetime characteristic for a virtual machine. This may include identifying a time that the virtual machine is set to expire or a duration of time that the virtual machine is scheduled to operate. As will be described in further detail below, this may influence a decision to live-migrate a virtual machine within the near future or, rather, simply wait until the virtual machine expires rather than live-migrate the virtual machine at all.

The data collection engine 202 can additionally identify a sensitivity characteristic for the virtual machine associated with a sensitivity of the virtual machine with respect to experiencing a disconnection and/or slowed connection with a client device. In particular, as mentioned above, different virtual machines may host or provide access to different applications, which may differ significantly in sensitivity to live-migration. For example, the data collection engine 202 can identify whether a virtual machine hosts a gaming application that is highly sensitive to outages (e.g., brownouts, blackouts) and may be incapable of tolerating a one or two second disconnection between a client device and the virtual machine. Alternatively, the data collection engine 202 can identify whether a virtual machine supports simple data storage features, which may have lower sensitivity to a temporary disconnection and may be better capable of tolerating multiple seconds of an outage without significantly impacting a customer experience.

The data collection engine 202 can further identify memory characteristics associated with memory access or utilization of memory on the server node by the virtual machine. This may include a type of processor implemented by the server node corresponding to the virtual machine, a type of memory access pattern, capabilities of the virtual machine or associated server node, or other characteristics associated with memory access or utilization of memory by the virtual machine.

In one or more implementations, the data collection engine 202 identifies customer or client characteristics associated with one or more client devices and/or customers that have access to the virtual machine. For example, where customers may vary from trial customers or guests having temporary access to a virtual machine to paying customers or high priority customers that frequently use one or multiple applications hosted by a virtual machine, the data collection engine 202 may identify one or more characteristics associated with the different types of customers.

As further shown in FIG. 2, the low-impact live-migration system 104 includes an impact prediction engine 204. The impact prediction engine 204 can evaluate some or all of the identified virtual machine characteristics to estimate a predicted impact that migrating a virtual machine will have on a customer. For example, the impact prediction engine 204 may evaluate a set of one or multiple types of virtual machine characteristics identified for a virtual machine to determine an estimated measure or level of impact (e.g., ranging from no impact to a high level of impact) that live-migrating the virtual machine from one server node to another server node will have on a customer. In one or more embodiments, the impact prediction engine 204 determines an estimated level of impact for each virtual machine on a server node or across multiple server nodes of the node cluster 208.

In one or more embodiments, the impact prediction engine 204 determines the predicted impact by determining an impact score for one or more of the virtual machines. The impact score indicates a predicted measure of impact ranging from zero impact to a high level of impact. As will be discussed in further detail below, the impact prediction engine 204 can includes an algorithm or model (e.g., a machine learning model) trained to determine a predicted impact score based on a combination of different virtual machine characteristics. The impact score may refer to a number, category, or other measure from a range of numbers where a lower number or category from the range indicates a low measure of impact while a higher number or category from the range indicates a high measure of impact.

As will be described in further detail below, the impact prediction engine 204 can include one or more algorithms or models that affect an impact score based on different types of virtual machine characteristics. For instance, the impact prediction engine 204 can consider different types of virtual machine characteristics using different models or based on different weighting factors to determine an impact score for a virtual machine having a set of virtual machine characteristics. Addition detail with regard to different types of models that may be included within the impact prediction engine 204 is provided in further detail below (e.g., in connection with FIG. 3).

As further shown in FIG. 2, the low-impact live-migration system 104 includes a migration engine 206. The migration engine 206 may selectively identify one or more virtual machines to live-migrate between server nodes of the node cluster 208. In one or more implementations, the migration engine 206 identifies a subset of virtual machines from a collection of virtual machines to live-migrate from one server node to another server node. As an example, the migration engine 206 can identify virtual machines 212a-b on a first server node 210a to live-migrate to a second server node 210b based on a determination that live-migrating the first and second virtual machines 212a-b will have a lower projected impact on a customer than migrating the virtual machines 212c-e on the second server node 210b.

As will be explained in further detail below, the migration engine 206 can selectively identify virtual machines for migration to improve operation of server nodes on the node cluster 208. For example, the migration engine 206 may selectively identify virtual machines for migration from a particular server node or node cluster to free up space on individual server nodes and/or across multiple server nodes of the node cluster. Accordingly, the migration engine 206 can selectively identify a subset of virtual machines from a collection of virtual machines having the lowest impact scores to live-migrate. This can free up space on the node cluster or on an individual server node while also minimizing an unfavorable impact of the live-migration process.

As another example, the migration engine 206 may identify sets of virtual machines on respective server nodes to live-migrate to ensure that the node cluster 208 has a desired number (e.g., a minimum threshold or other predetermined number) of empty nodes on the node cluster 208. Accordingly, in one or more implementations, the migration engine 206 identifies a server node including a set of virtual machines having lower impact scores (e.g., a lower combined impact score) than a different set of virtual machines on another server node. In this way, the migration engine 206 can selectively evacuate an entire server node determined to have the lowest migration impact relative to other server nodes on the node cluster.

Accordingly, the migration engine 206 can selectively identify virtual machines to migrate to both minimize unfavorable impacts of live-migration and redistribute virtual machines across server nodes of the node cluster 208 in such a way to improve performance of the server nodes 210a-c on the node cluster 208. Additional examples of selectively identifying virtual machines to accommodate various applications of the server node are provided in connection with FIGS. 4-5 below.

Figure 3:
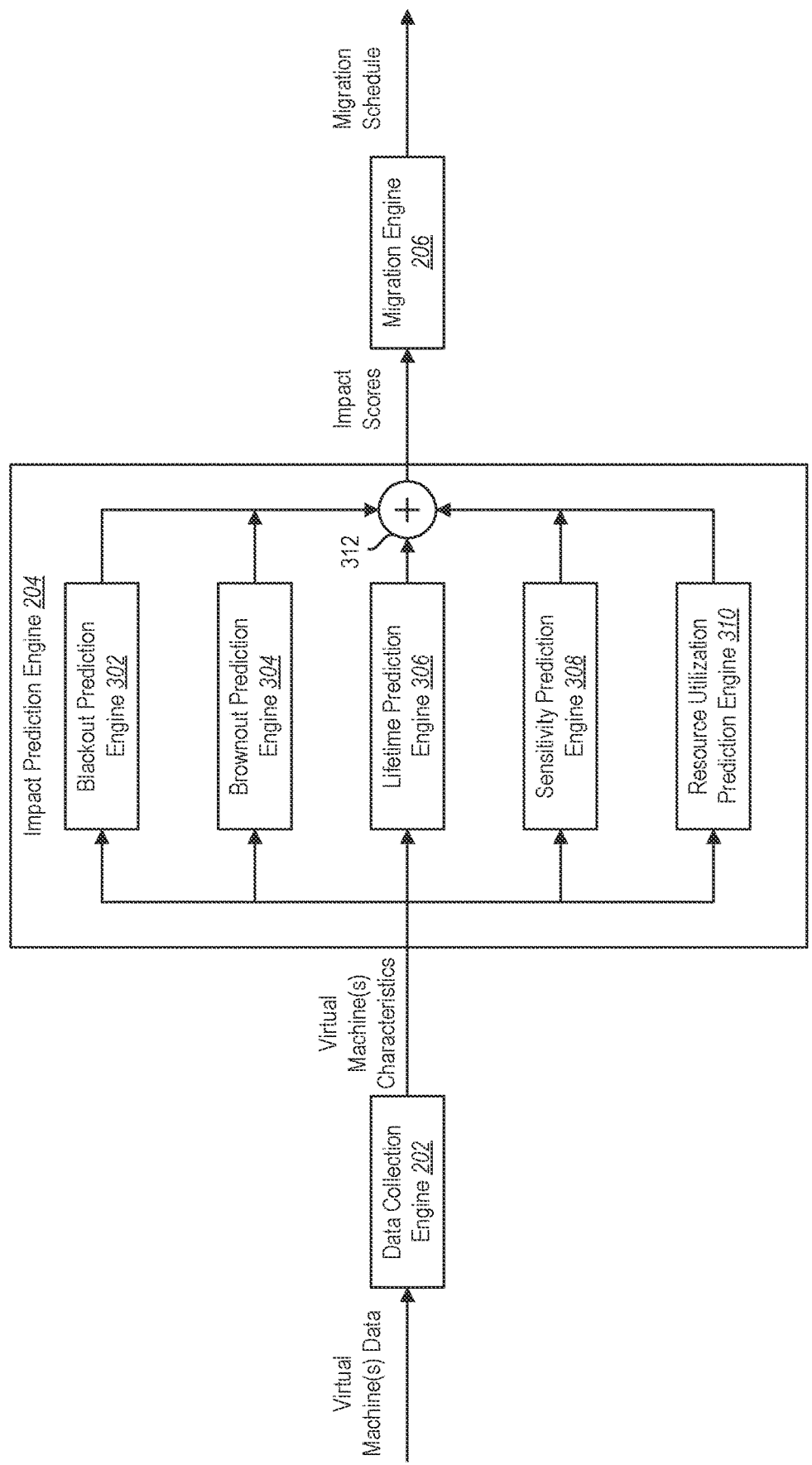
FIG. 3 illustrates an example framework for selectively live-migrating virtual machines to minimize impact in accordance with one or more implementations.

FIG. 3 illustrates an example framework for selectively identifying virtual machines for migration based on impact scores determined for the virtual machines implemented by the low-impact live-migration system 104. In particular, as shown in FIG. 3, the framework includes the data collection engine 202, impact prediction engine 204, and migration engine 206 that the low-impact live-migration system 104 utilizes to collect virtual machine characteristics, determine impact scores based on the virtual machine characteristics, and further identify virtual machines for live-migration based on the impact scores.

In particular, as shown in FIG. 3, the data collection engine 202 receives, collects, or otherwise accesses virtual machine data including any data associated with one or more virtual machines. This may include information about a virtual machine, information about a client device or customer associated with the virtual machine, and/or information about a server node and/or node cluster on which the virtual machine operates.

The data collection engine 202 may evaluate the data to identify one or more virtual machine characteristics associated with the virtual machine(s). For instance, in one or more embodiments, the data collection engine analyzes the virtual machine data to identify one or more discrete signals or characteristics of the virtual machines that may be associated with or influence a projected impact of live-migrating the virtual machines. This may include identifying a size of a virtual machine, memory access patterns of the virtual machine, sensitivity of the virtual machine, a priority of a customer associated with the virtual machine, or any other virtual machine characteristic(s).

The data collection engine 202 can provide any number of virtual machine characteristics to the impact prediction engine 204, which can determine impact scores for any number of virtual machines associated with the virtual machine characteristics. The impact prediction engine 204 can determine impact scores based on the virtual machine characteristics in accordance with one or more embodiments described above. In addition, as shown in FIG. 3, the impact prediction engine 204 may include one or more different types of prediction engines trained to determine discrete impact scores associated with different types of predicted impacts that live-migrating a virtual machine may cause.

For example, as shown in FIG. 3, the impact prediction engine 204 includes a blackout prediction engine 302, a brownout prediction engine 304, a lifetime prediction engine 306, a sensitivity prediction engine 308, and a resource utilization prediction engine 310. As will be discussed further, each of the different types of prediction engines 302-310 may predict an impact score associated with a different type of customer impact. In addition, these prediction engines 302-310 are described by way of example, and one or more embodiments of the impact prediction engine 204 may include additional types of prediction engines trained to determine prediction scores associated with different types of customer impacts (e.g., based on the virtual machine characteristics provided by the data collection engine 202).

As mentioned above, the impact prediction engine 204 includes a blackout prediction engine 302. The blackout prediction engine 302 may include an algorithm or prediction model trained to determine a predicted blackout time for a virtual machine based on a corresponding set of virtual machine characteristics associated with the virtual machine. For example, the blackout prediction engine 302 may determine an estimated time-period that a virtual machine will become disconnected from a client device as a result of live-migrating the virtual machine from one server node to another server node on a node cluster. In addition, or as an alternative to determining an estimated time of disconnection, the blackout prediction engine 302 may determine an estimated period of time that the virtual machine is frozen during which no codes or instructions are executed. The predicted blackout time may range anywhere from a very small time-duration (e.g., 0 seconds) corresponding to a low impact score to a high time-duration (e.g., 30+ seconds) corresponding to a high impact score.

The blackout prediction engine 302 can determine the predicted impact score in a number of ways and based on any combination of virtual machine characteristics. For example, one or more implementations of the blackout prediction engine 302 can include an algorithm or machine learning model trained to classify or categorize the virtual machine into one of a predetermined range of blackout times. In particular, the blackout prediction engine 302 can apply a machine learning model or an algorithm to a set of virtual machine characteristics to predict a blackout time that the virtual machine is expected to experience and classify the virtual machine based on one of a plurality of blackout time ranges.

As a non-limiting example, the blackout prediction engine 302 may utilize a Random Forest learning algorithm trained to analyze a set of virtual machine characteristics or features to predict a blackout category corresponding to a discrete range of blackout times that the virtual machine is predicted to experience as a result of live-migration. In determining the predicted blackout time, the Random Forest learning algorithm may analyze characteristics including, by way of example, cluster characteristics, OS characteristics, size of the virtual machine, size of a family of virtual machines, customer usage patterns (e.g., heavy or light usage on weekdays, at night, or during specific times of the day), a number of cores of a processor operating in connection with the virtual machine and/or on a corresponding server node, or any other characteristics for which the blackout prediction engine 302 is trained to utilize in predicting a blackout time that the virtual machine will experience as a result of live-migrating the virtual machine between server nodes.

In one or more embodiments, the blackout prediction engine 302 generates an impact score including a classification of the virtual machine within a category of blackout times. For example, the blackout prediction engine 302 can utilize the Random Forest learning algorithm or other prediction model to determine a predicted blackout time for the virtual machine and categorize the virtual machine into a bucket or other category of blackout time ranges. For instance, the blackout prediction engine 302 can classify the virtual machine into one of a plurality of categories or buckets using a log linear scale. An example of a log linear scale of categories includes a first bucket for a predicted blackout time of less than 0.1 seconds, a second bucket for a predicted blackout time between 0.1 seconds and 1.0 seconds, a third bucket for a predicted blackout time between 1.0 seconds and 5.0 seconds, a fourth bucket for a predicted blackout time between 5.0 and 10.0 seconds, and a fifth bucket for any predicted blackout time greater than 10.0 seconds. Other ranges of predicted blackout times may similarly apply.

Utilizing a machine learning model trained to predict categories of blackout times using a log linear scale has been found to yield accurate predictions of estimated blackout times. In particular, tests that utilize a Random Forest learning algorithm that determines a predicted category of blackout times on a log linear scale (e.g., according to the categories just mentioned in connection with the blackout prediction engine 302) based on virtual machine characteristics including cluster size, OS type, virtual machine size, a count of processing cores, virtual machine memory type, and other virtual machine characteristics have been found to predict a blackout time category with at least 89% accuracy.

As mentioned above, the impact prediction engine 204 may include a brownout prediction engine 304. The brownout prediction engine 304 may include a prediction model or algorithm to determine a predicted brownout time for a virtual machine based on a corresponding set of virtual machine characteristics associated with the virtual machine. For example, the brownout prediction engine 304 may determine an estimated duration of time that a virtual machine will experience a slow connection (e.g., a slower than normal connection under typical operating conditions) as a result of live-migrating the virtual machine from one server node to another server node on the cloud computing system 101. As another example, the brownout prediction engine 304 may determine a period of time during which the virtual machine will provide limited functionality (e.g., reduced throughout, increased latency, limited I/O capabilities, or other functions otherwise available when operating at full functionality), The predicted brownout time may range from a very small duration of time (e.g., less than one minute) corresponding to a low impact score to a high duration of time (e.g., an hour or more) corresponding to a high impact score.

Similar to the blackout prediction engine 302, the brownout prediction engine 304 can determine the predicted impact score in a number of ways and based on any combination of virtual machine characteristics. For example, one implementation of the brownout prediction engine 304 can include an algorithm or machine learning model trained to classify or categorize the virtual machine into one of a predetermined range of brownout times. In particular, the brownout prediction engine 302 can apply a machine learning model or an algorithm to a set of virtual machine characteristics to predict a brownout time that the virtual machine is expected to experience and classify the virtual machine based on one of a plurality of brownout time ranges.

As a non-limiting example, the brownout prediction engine 304 may utilize a Random Forest learning algorithm trained to analyze a set of virtual machine characteristics or features to predict a brownout category corresponding to a discrete range of brownout times that the virtual machine is predicted to experience as a result of live-migration. In determining the predicted brownout time, the Random Forest learning algorithm may analyze characteristics including similar characteristics as described above in connection with the blackout prediction engine 302. Alternatively, the brownout prediction engine 304 may consider other characteristics that may have an impact on brownout times.

In one or more embodiments, the brownout prediction engine 304 generates an impact score including a classification of the virtual machine within a category of blackout times. For example, the brownout prediction engine 304 can utilize the Random Forest learning algorithm or other prediction model to determine a predicted brownout time for the virtual machine and categorize the virtual machine into a bucket or other category of brownout time ranges. For instance, the brownout prediction engine 304 can classify the virtual machine into one of a plurality of categories or buckets using a log linear scale. An example of a log linear scale of categories includes a first bucket for a predicted brownout time of less than 1.0 minutes, a second bucket for a predicted brownout time between 1.0 minutes and 5.0 minutes, a third bucket for a predicted brownout time between 5.0 minutes and 10.0 minutes, a fourth bucket for a predicted brownout time between 10.0 minutes and 20.0 minutes, a fifth bucket for a predicted brownout time between 20.0 minutes and 50.0 minutes, and a sixth bucket for a predicted brownout time greater than 50.0 minutes. Other ranges of predicted brownout times may similarly apply.

Utilizing a machine learning model trained to predict buckets or categories of brownout times using a log linear scale has been found to yield accurate predictions of estimated brownout times. In particular, tests that utilize a Random Forest learning algorithm that determines a predicted category of blackout times on a log linear scale (e.g., according to the categories just mentioned with regard to the brownout prediction engine 304) based on virtual machine characteristics including cluster size, OS type, virtual machine size, a count of processing cores, virtual machine memory type, and other virtual machine characteristics have been found to be able to predict a brownout time category with at least 91% accuracy.

As mentioned above, the impact prediction engine 204 includes a lifetime prediction engine 306. The lifetime prediction engine 306 may include a neural network or other machine learning model trained to identify a predicted lifetime as well as determine an impact score based on time that a given virtual machine is set to expire or disconnect from the cloud computing system 101. For instance, where a virtual machine has a limited lifespan corresponding to a subscription, a trial period, or other virtual machine characteristic associated with a time that the virtual machine will disconnect from the cloud computing system 101, the impact prediction engine 204 may determine an impact score that indicates the scheduled disconnection.

As an example, where a virtual machine is set to disconnect within 1-2 days (or prior to a time when the virtual machine would need to live-migrate to a destination node), and where the reason for live-migrating the virtual machine is not particularly urgent, the lifetime prediction engine 306 may generate a high impact score or other indication that the migration engine 206 would use to determine not to live-migrate the virtual machine. Indeed, where the virtual machine is set to expire in the near future, live-migrating the virtual machine may server a very limited purpose, and the migration engine 206 may determine that the least impact to the customer would be achieved by simply not migrating the virtual machine based on the projected lifetime of the virtual machine.

As further shown, the impact prediction engine 204 includes a sensitivity prediction engine 308. The sensitivity prediction engine 308 may include a model or algorithm to predict an impact score based on a predicted sensitivity of the virtual machine and/or applications (or specific code) running thereon. For example, where virtual machine characteristics indicate a high tolerance to blackouts and/or brownouts, the sensitivity prediction engine 308 may generate a low impact score indicating that live-migrating the virtual machine, even where blackouts or brownouts may occur, will have a minimal impact on a customer experience. Alternatively, where a virtual machine is predicted to have a low tolerance for blackouts and/or brownouts, the sensitivity prediction engine 308 may generate a high impact score indicating that even a small or trivial blackout and/or brownout will have a significant impact on the customer experience. As another example, an owner, administrator, or customer associated with a virtual machine may mark the virtual machine as sensitive or otherwise risk averse, which the sensitivity prediction engine 204 may use in determined a predicted sensitivity for the virtual machine.

The impact prediction engine 204 may further include a resource utilization prediction engine 310. The resource utilization prediction engine 310 may generate an impact score based on memory access characteristics or computing architecture of the virtual machine that may have an additional influence on a projected impact of live-migrating the virtual machine.

In one or more embodiments, each of the different types of prediction engines 302-310 generates an individual impact score based on different models or algorithms related to the virtual machine characteristics provided by the data collection engine 202. For example, where the impact prediction engine 204 includes five different prediction engines 302-310, the impact prediction engine 204 may generate five different impact scores (e.g., impact sub-scores) ranging from low to high. In one or more embodiments, the prediction engine 204 combines the different impact scores to generate a combined impact score reflective of a predicted impact of live-migrating the virtual machine associated with a corresponding set of virtual machine characteristics.

For example, as shown in FIG. 3, the impact prediction engine 204 includes a combiner 312 including a model or algorithm for combining multiple discrete impact scores (e.g., two or more impact sub-scores) from the different prediction engines 302-310 within the impact prediction engine 204. The combiner 312 can accumulate the impact scores in a variety of ways. For example, the combiner 312 can generate a weighted sum of impact scores by applying one or more weights to the individual impact scores to grant a higher weight to those impacts scores that may have a higher influence on projected impact (e.g., blackout and brownout impact scores) while applying a lower weight to one or more impact scores that have a lesser influence on the projected impact. Different impact scores may have higher or lower weights depending on a purpose or triggering circumstance for live-migrating the virtual machine(s).

Moreover, while FIG. 3 illustrates one example in which each of the impact scores are provided to a combiner 312 to sum or otherwise combine the discrete impact scores, the impact prediction engine 204 may have a different series of inputs in which impact scores for one or more of the prediction engines depend from one or more impact scores determined by other prediction engines. For example, where the lifetime prediction engine 306 identifies that a virtual machine is set to expire in the near future (e.g., prior to a time when the virtual machine would be scheduled to live-migrate), an associate impact score may be weighted considerably higher than any other discrete impact score. Alternatively, where the lifetime prediction engine 306 determines that a virtual machine is not set to expire (or not set to expire for a long time), a corresponding impact score may have a minimal influence (e.g., zero influence) on a predicted impact of live-migrating.

Alternatively, in one or more embodiments, impact prediction engine 204 only utilizes a subset of the different prediction engines 302-310. For example, where a virtual machine lifetime is not a factor (e.g., a virtual machine is not predicted to ever terminate), the impact prediction engine 204 may exclude the lifetime prediction engine 306 from determining and providing a corresponding impact sub-score to the combiner 312 to determine a combined impact score. In addition, the impact prediction engine 204 may utilize different subsets of the different prediction engines 302-310 based on a condition that triggers the low-impact live-migration system 104 to determine which virtual machine(s) to live-migrate (e.g., detecting fewer than a threshold number of empty server nodes, predicting failure of a server node, etc.).

Accordingly, while one or more embodiments of the combiner 312 include an algorithm or model for determining a combined impact score based on a weighted sum, the combiner 312 may consider additional factors and/or implement a variety of algorithms and models to accurately determine a projected impact of live-migrating a virtual machine. In addition, the combiner 312 may consider an application or goal of the live-migration in accordance with one or more examples described above (e.g., load balancing, increasing fault tolerance, de-fragmentation, evacuating a server node based on predicted failure or a scheduled OS update, etc.)

Upon generating the predicted impact score (e.g., based on a combination of the impact scores generated by the different prediction engines 302-310, the impact prediction engine 204 provides the impact score(s) for one or more virtual machines to the migration engine 206. In accordance with one or more examples described above, the migration engine 206 can selectively identify virtual machines to live-migrate based on corresponding impact scores. In particular, the migration engine 206 may identify a combination of one or more virtual machines (e.g., a subset of virtual machines from a collection of virtual machines) to live-migrate based on impact scores.

In addition to generally identifying one or more candidate virtual machines (or candidate nodes) for live-migration, the migration engine 206 can additional generate a migration schedule indicating both the candidate virtual machines selected for live-migration and a timing of live-migrating one or more candidate virtual machines. For example, in one or more embodiments, the migration engine 206 generates a migration schedule that identifies one or more virtual machines associated with low impact scores and identifies one or more times for a scheduled live-migration of the virtual machine(s) from one server node to another server node.

The migration engine 206 can schedule the time of the live-migration based on one or more prediction scores and/or based on virtual machine characteristics indicating usage patterns of the virtual machine(s). For example, the migration engine 206 can schedule live-migration of a first virtual machine at night where virtual machine characteristics indicate that the first virtual machine has a lower rate of usage at night than during the day. The migration engine 206 can alternatively schedule live-migration of a second virtual machine during the day where virtual machine characteristics indicate that the second virtual machine has a lower rate of usage during the day than at night. Indeed, the migration engine 206 can identify multiple virtual machines as well as schedule different times for live-migrating the respective virtual machines.

In addition to identifying virtual machines for live-migration and scheduling a time for initiating the live-migration, the migration engine 206 can additionally determine a destination server node. In particular, the migration engine 206 can identify a destination server node to receive the virtual machine as part of the live-migration. The destination server node may be on the same node cluster as the server node from which the virtual machine is live-migrating. Alternatively, the destination node may be on a different node cluster within the cloud computing system 101.

The migration engine 206 may determine the destination server node based on a variety of factors. For example, the migration engine 206 may identify a destination server node having similar hardware or similar OS as the node from which the virtual machine is migrating. The migration engine 206 can similarly identify an empty node or a node already having one or more virtual machines thereon based on a purpose of live-migrating the virtual machine (e.g., to free up one or more empty nodes or to load balance between different server nodes to allow for scaling of a virtual machine).

Figure 4:
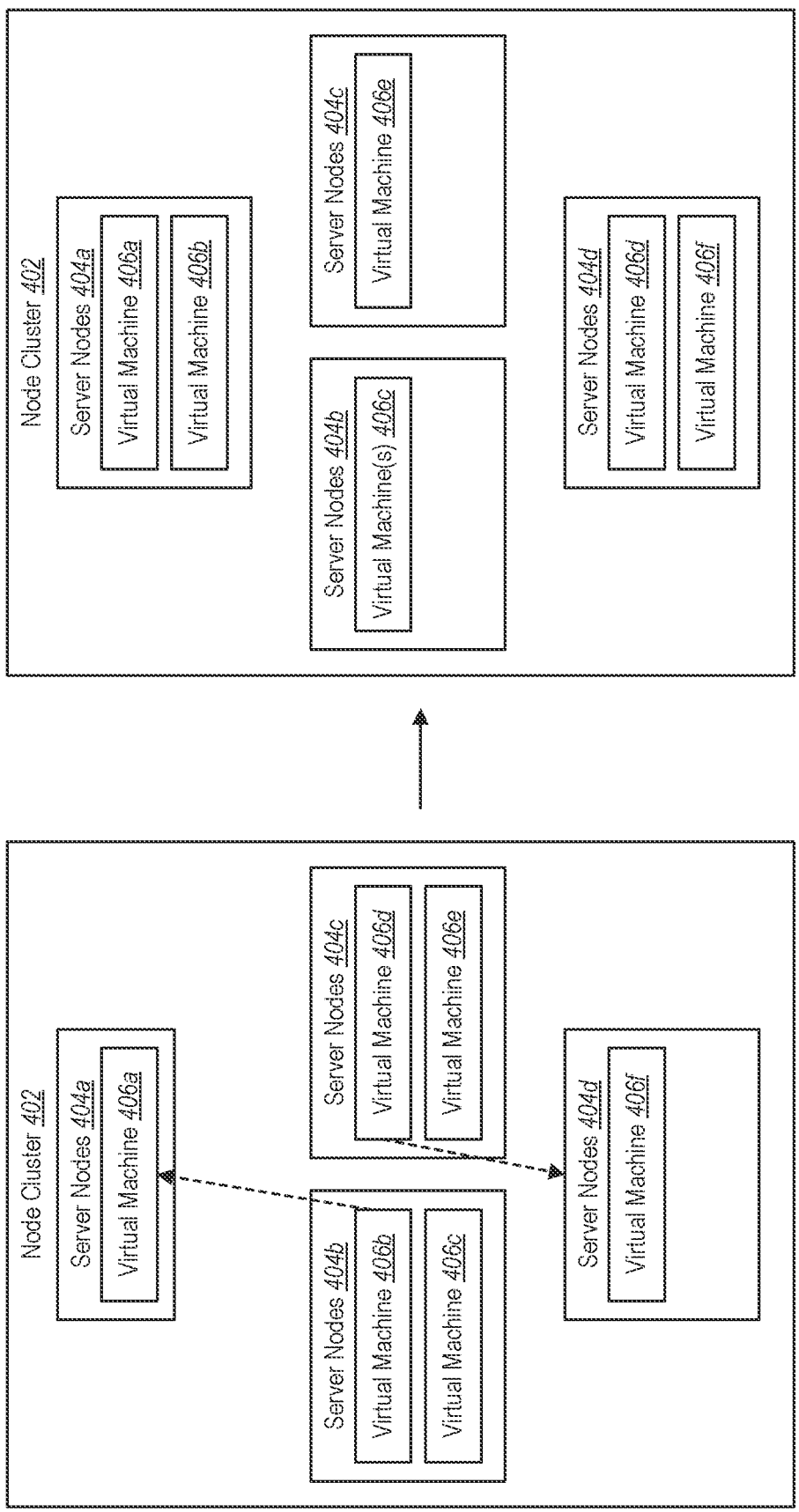
FIG. 4 illustrates an example implementation in which virtual machines are selectively live-migrated between nodes of a node cluster.

FIG. 4 illustrates an example implementation in which a low-impact live-migration system 104 selectively identifies a subset of virtual machines from within a node cluster to migrate from corresponding server nodes to destination nodes. For example, as shown in FIG. 4, an example node cluster 402 includes server nodes 404a-404d. A first server node 404a includes a virtual machine 406a, a second server node 404b includes virtual machines 406b-c, a third server node 404c includes virtual machines 406d-e, and a fourth server node 404d includes a virtual machine 406f.

The low-impact live-migration system 104 may collect and analyze virtual machine characteristics for each of the virtual machines 406a-f on the different server nodes 404a-d of the node cluster 402. The low-impact live-migration system 104 can further apply an impact prediction engine 204 including any number of different types of prediction engines (e.g., prediction engines 302-310) to determine impact scores for each of the virtual machines 406a-f.

While one or more embodiments involve applying the impact prediction engine 204 to determine impact scores for each of the virtual machines, the low-impact live-migration system 104 may selectively apply the impact prediction engine 204 to a subset of the virtual machines based on a desired goal or reason for triggering the live-migration. For example, where the low-impact live-migration system 104 is initiating the analysis and live-migration based on a goal of freeing up allocatable space on the second server node 404b and the third server node 404c and the decision of live-migrating the virtual machine comes down to determining which virtual machine from those two server nodes should be migrated to achieve the lowest customer impact, the low-impact live-migration system 104 may limit analysis of virtual machine characteristics to determine impact scores for only those virtual machines on the server nodes of interest (e.g., virtual machines 406b-e) without applying the impact prediction engine 204 to other virtual machines on other server nodes within the node cluster 402. As another example, where one or more virtual machines are designated or identified as high-priority or otherwise tagged for not being live-migrated (except under potential node-failure conditions), the low-impact live-migration system 104 may similarly forego analysis of those virtual machines in some cases.

As shown in FIG. 4, the low-impact live-migration system 104 may identify the second virtual machine 406b on the second server node 404b and the fourth virtual machine 406d on the third server node 404c as candidate virtual machines for live-migration. The low-impact live-migration system 104 can additionally identify the first server node 404a and the fourth server node 404d as destination nodes for the live-migration. The low-impact live-migration system 104 may determine the destination nodes for each of the respective candidate virtual machines 406b, 406d based on the virtual machine characteristics. For example, the low-impact live-migration system 104 may determine that live-migrating the second virtual machine 406b to the first server node 404a and live-migrating the fourth virtual machine 406d to the fourth server node 404d provides the better load balance based on the sizes or other characteristics of the respective virtual machines 406b, 4046d.

As shown in FIG. 4, after initiating and performing the live-migration, the node cluster 402 includes the first server node 404a including the first virtual machine 406a and the second virtual machine 406b, the second server node 404b including the third virtual machine 406c, the third server node 404c including the fifth virtual machine 406e, and the fourth server node 404d including the fourth virtual machine 406d and the sixth virtual machine 406f.

Figure 5:
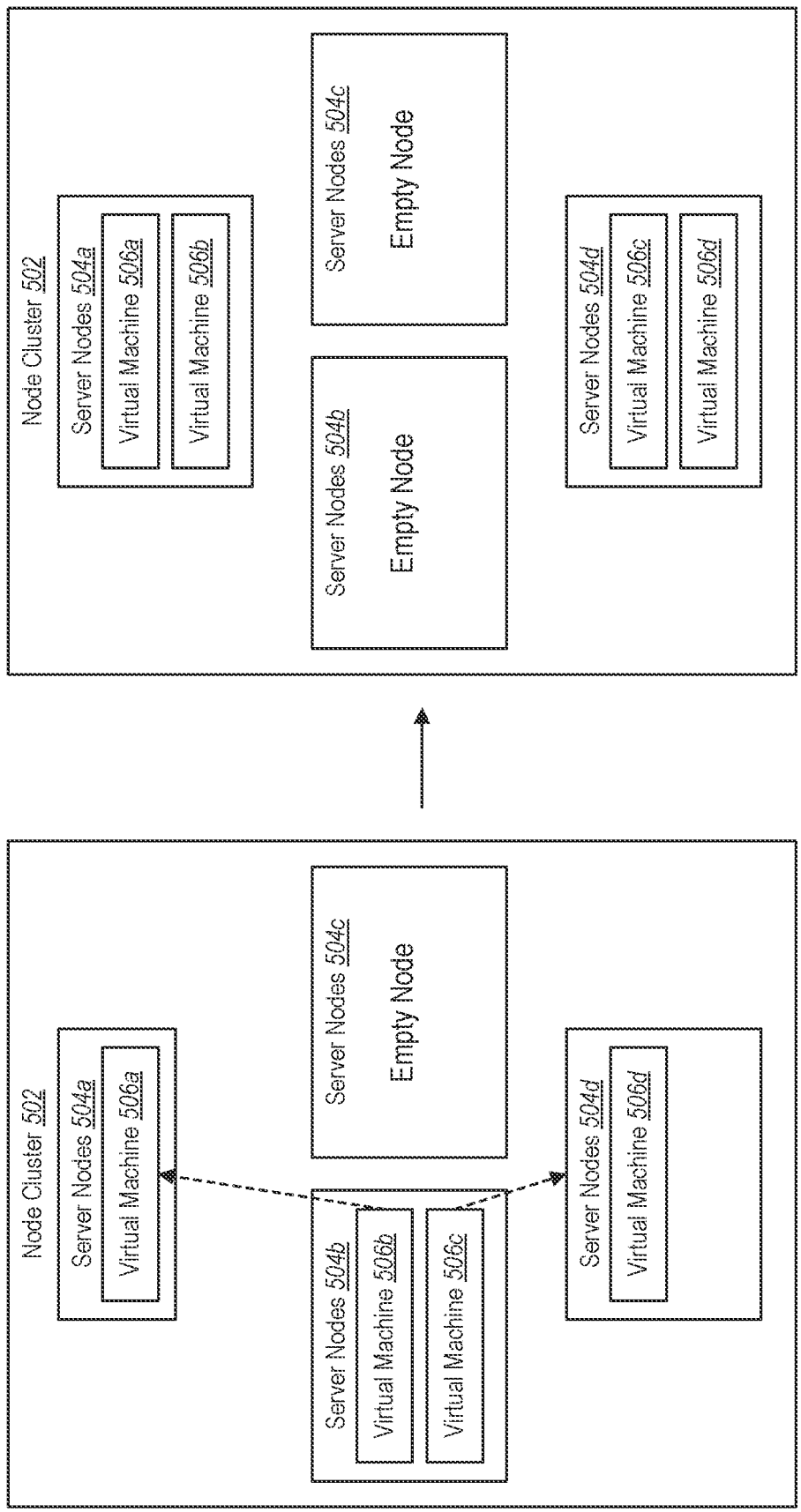
FIG. 5 illustrates another example implementation in which virtual machines are selectively live-migrated between nodes of a node cluster.

FIG. 5 illustrates an additional example implementation in which the low-impact live-migration system 104 selectively identifies a subset of virtual machines from a node cluster to migrate from corresponding server nodes to destination server nodes. For example, as shown in FIG. 5 an example node cluster 502 includes server nodes 504a-d. The first server node 504a includes a first virtual machine 506a, a second server node 504b includes second and third virtual machines 506b-c, a third server node 504c is an empty node, and a fourth server node 504d has a fourth virtual machine.

Similar to one or more examples described above, the low-impact live-migration system 104 can analyze virtual machine characteristics for some or all of the virtual machines 506a-d to determine impact scores for the respective virtual machines. In this example, the low-impact live-migration system 104 may identify a set of virtual machines for migration based on instructions to maintain a threshold number of empty nodes, a predicted failure of one or more server nodes, a scheduled OS update, or other circumstances that necessitate evacuating one or more of the server nodes 504a-d.

In the example shown in FIG. 5, the low-impact live-migration system 104 may determine impact scores for the virtual machines 506a-d to identify one of the server nodes having virtual machines thereon that have a lower predicted impact of live-migrating the virtual machines from that server node. For example, the low-impact live-migration system 104 may determine that a combined impact score (e.g., a sum or other combination of the impact scores) for the second virtual machine 506b and the third virtual machine 506c on the second server node 504b is less than an impact score for the first virtual machine 506a or the fourth virtual machine 506d. Accordingly, the low-impact live-migration system 104 can determine that live-migrating the second virtual machine 506b and the third virtual machine 506c will have less of an impact than migrating either of the first virtual machine 506a or the fourth virtual machine 506d individually.

As mentioned above, in addition to generally selectively identifying a subset of virtual machine to live-migrate, the low-impact live-migration system 104 can additionally generate a migration schedule or otherwise identify a time for live-migrating the selected virtual machines to further minimize an impact of the live-migration. For example, the low-impact live-migration system 104 can identify a first time for live-migrating the second virtual machine 506b and a second time (e.g., a different day or time of day) for live-migrating the third virtual machine 506c.

As shown in FIG. 5, after initiating and performing the live-migration, the node cluster 502 includes the first server node 504a including the first virtual machine 506a and the second virtual machine 506b and the fourth server node 504d including the third virtual machine 506c and the fourth virtual machine 506d. In addition, after performing the live-migration, the node cluster 502 includes empty nodes 504*b-c*, which may correspond to a predetermined number (e.g., a minimum or desired threshold) of empty nodes on the node cluster 502.

As noted above, the low-impact live-migration system 104 can evacuate one or more nodes under various circumstances. For example, the low-impact live-migration system 104 can identify a server node from a node cluster to evacuate in order to have a minimum threshold or other desired number of empty nodes. As another example, the low-impact live-migration system 104 can identify an empty node for evacuation based on a scheduled OS upgrade that necessitates evacuating the server node within a limited window of time. In one or more embodiments, the low-impact live-migration system 104 receives an indication or predicts an instance of node failure and evaluates the virtual machines to determine a time within the limited window when live-migrating the virtual machines will have a minimal impact on customers.

In any of the above and other circumstances, the low-impact live-migration system 104 may receive an indication or determine a level of urgency associated with live-migrating one or more virtual machines. For example, where a node cluster of thirty server nodes optimally includes five empty nodes, the low-impact live-migration system 104 may determine that a desired threshold of empty nodes if five. Accordingly, where the node cluster only has four empty nodes, the low-impact live-migration system 104 may begin the process of evaluating virtual machine characteristics to selectively identify a server node to evacuate based on impact scores of virtual machines thereon.

In another example, where the node cluster has only one (or zero) empty nodes (or multiple nodes less than the desired number of empty nodes), the low-impact live-migration system 104 may similarly evaluate the server nodes to identify a candidate node for migration with an additional measure of urgency. For example, the low-impact live-migration system 104 may determine not to live-migrate one or more virtual machines even where the node cluster does not have a desired number of empty nodes based on a determination that live-migrating a set of virtual machines to empty a server node will have a significantly unfavorable impact. However, over time, as additional empty nodes have virtual machines implemented thereon, the low-impact live-migration system 104 may determine that emptying one or more server nodes has become more urgent and decide to live-migrate virtual machines having a higher predicted impact based on a higher urgency to empty the server nodes.

In other words, the low-impact live-migration system 104 may determine whether to live-migrate one or more virtual machines based on impact score(s) in addition to a threshold impact in accordance with circumstances that trigger live-migration of the virtual machine. In addition, based on changing circumstances that may change a level of urgency, the low-impact live-migration system 104 may determine that a different threshold level of impact should apply in deciding whether to live-migrate one or more candidate virtual machines. An example implementation is described in further detail in connection with FIG. 6.

Figure 6:
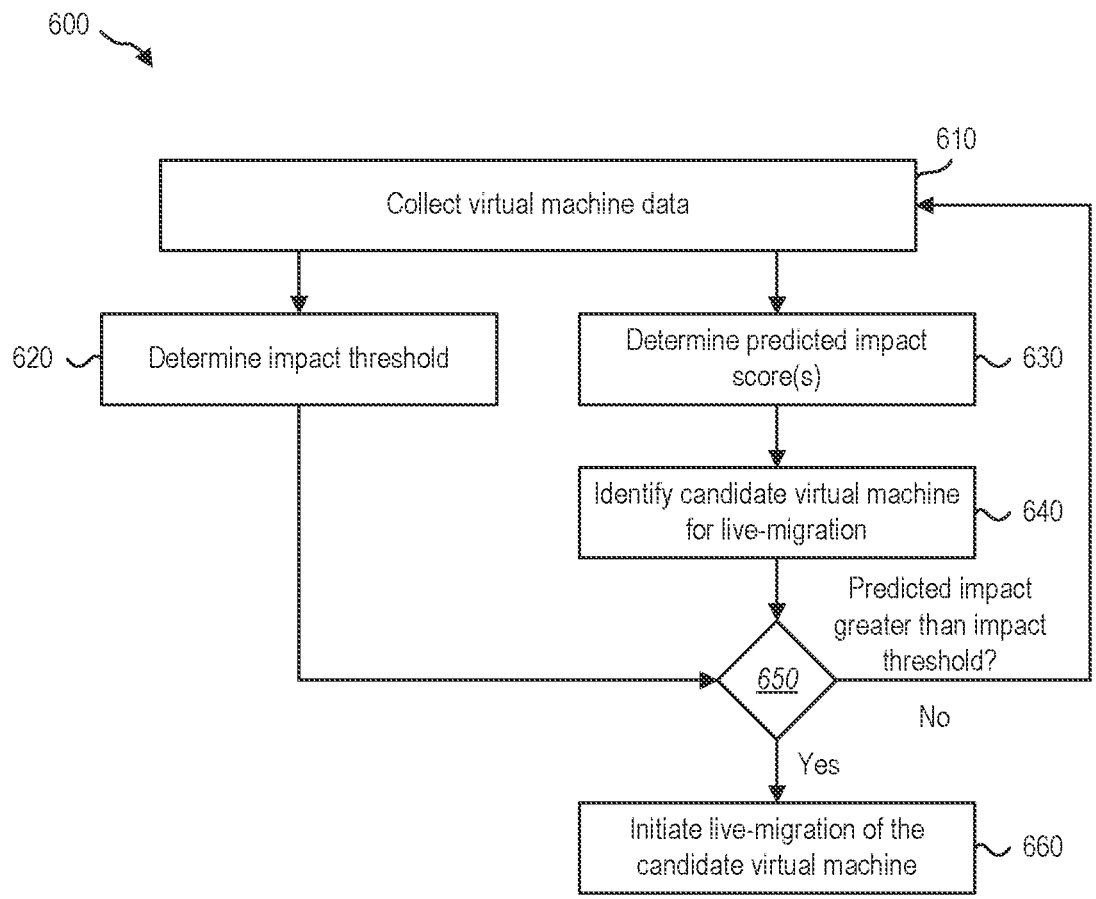
FIG. 6 illustrates an example process for live-migrating a virtual machine in accordance with one or more implementations.

FIG. 6 illustrates an example series of acts 600 for selectively identifying one or more virtual machines for live-migration based on determined impact scores and further in view of a threshold impact. The series of acts 600 shown in FIG. 6 may be performed by the low-impact live-migration system 104 in accordance with one or more embodiments described herein. For example, as shown in FIG. 6, the low-impact live-migration system 104 can perform an act 610 of collecting virtual machine data. The act 610 of collecting the virtual machine data may include similar features as discussed above with identifying virtual machine characteristics by the data collection engine 202 discussed above.

The low-impact live-migration system 104 can further perform an act 620 of determining an impact threshold. As mentioned above, the low-impact live-migration system 104 may determine an impact threshold based on a current resource allocation state of a node cluster or a server node, which may involve an analysis of characteristics of a server node, node cluster, or conditions that trigger the decision to live-migrate the virtual machine(s). For example, the low-impact live-migration system 104 may determine an impact threshold based on a number of empty nodes in a node cluster compared to a desired number or minimum number of server nodes for the node cluster. Accordingly, the low-impact live-migration system 104 may identify a high impact threshold where the node cluster already has a desired number or minimum threshold of empty nodes thereon. Alternatively, the low-impact live-migration system 104 may lower the impact threshold as the number of empty nodes decreases or comes closer to a minimum threshold of virtual machines.

As another example, the low-impact live-migration system 104 may determine an impact threshold based on a time period within which live-migration of the virtual machine needs to occur. For example, where the low-impact live-migration system 104 determines or receives an indication of an estimated failure of a server node, the low-impact live-migration system 104 may determine the impact threshold based on an amount of time between the present and the estimated failure of the server node. Accordingly, where the estimated failure of the server node is multiple days away, the low-impact live-migration system 104 may have a higher impact threshold (e.g., indicating a lower sense of urgency) than if the estimated failure of the server node were only a few hours away. Therefore, the low-impact live-migration system 104 can determine a different impact threshold as well as modify the impact threshold over time based on characteristics of virtual machines, server nodes, a node cluster, and/or circumstances associated with triggering the live-migration of the virtual machine(s).

As another example, the low-impact live-migration system 104 may determine an impact threshold based on a current fault tolerance of a node cluster or select server nodes. For example, where a node cluster includes a first server node that is overloaded with virtual machines, the low-impact live-migration system 104 may apply a different migration threshold when determining whether to migrate virtual machines from the first server node than a second server node that is less overloaded and has a higher fault tolerance than the first server node. Accordingly, in one or more embodiments, the low-impact live-migration system 104 can determine a different impact threshold based on a detected fault tolerance for a given server node or specific virtual machine(s).

As a further example, the low-impact live-migration system 104 can determine an impact threshold based on an owner of the virtual machine and/or instructions received from the owner. For instance, the low-impact live-migration system 104 can assign a high or low impact threshold to different owners or customers. Further, in one or more implementations, the low-impact live-migration system 104 can assign or otherwise determine a threshold in response to receiving instructions (e.g., a selected setting or marker) indicating or marking that virtual machine as risk-averse, and that an appropriately high or low impact threshold should be associated with the virtual machine.

As further shown in FIG. 6, the low-impact live-migration system 104 can perform an act 630 of determining predicted impact scores. In particular, the low-impact live-migration system 104 can determine predicted impact scores for any number of virtual machines on a server node and/or across multiple server nodes of the cloud computing system 101. In one or more embodiments, the low-impact live-migration system 104 determines the predicted impact score(s) by applying an impact prediction engine 204 to virtual machine characteristics in accordance with one or more examples described above.

The low-impact live-migration system 104 can additionally perform an act 640 of identifying a candidate virtual machine for live-migration. This may involve identifying a virtual machine from a set of virtual machines having the lowest impact score. For example, the low-impact live-migration system 104 may identify a candidate virtual machine from a set of virtual machines of a server node to live-migrate based on a determination that the candidate virtual machine has a lower impact score than other virtual machines on the server node. The low-impact live-migration system 104 can similarly identify a candidate virtual machine from a set of virtual machines across multiple server nodes.

While the low-impact live-migration system 104 may identify a candidate virtual machines, in one or more embodiments, the low-impact live-migration system 104 identifies a candidate server node based on impact scores for one or multiple virtual machines thereon. For example, the low-impact live-migration system 104 may identify a candidate server node from a plurality of server nodes based on a determination that a combination of impact scores (e.g., a sum of impact scores) for virtual machines on the candidate server node is less than a combined impact score of one or more virtual machines on other server nodes from the plurality of server nodes.

As shown in FIG. 6, the low-impact live-migration system 104 can additionally perform an act 650 of determining whether the predicted impact (e.g., the impact score) is greater than an impact threshold (e.g., a threshold impact score). If the predicted impact is not greater than the impact threshold, the low-impact live-migration system 104 may forego live-migrating the candidate virtual machine (or candidate server node) and instead continue collecting virtual machine data to determine if one or more of the impact threshold or impact score(s) changes over time.

Alternatively, where the low-impact live-migration system 104 determines that the predicted impact is greater than the impact threshold, the low-impact live-migration system 104 can perform an act 660 of initiating live-migration of the candidate virtual machine. In one or more embodiments, the low-impact live-migration system 104 utilizes the migration engine 206 to identify a time to initiate or otherwise carry out the live-migration. The low-impact live-migration system 104 can additionally determine a destination node on the same or different node cluster to receive the candidate virtual machine.

Figure 7:
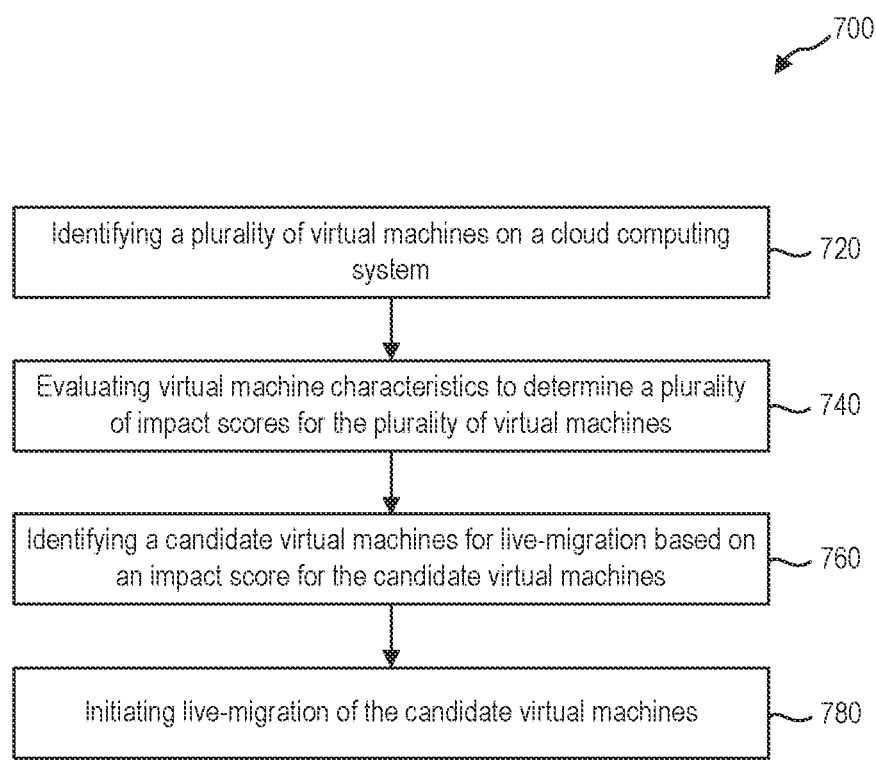
FIG. 7 illustrates an example of a method for live-migrating one or more virtual machines from a select server node in accordance with the present disclosure.
Figure 8:
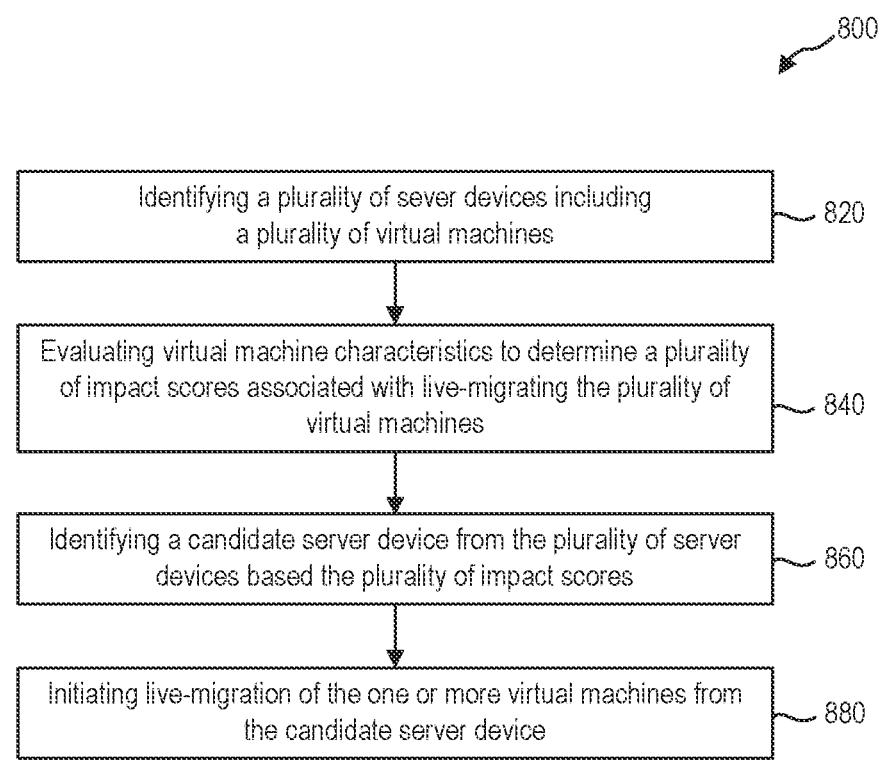
FIG. 8 illustrates certain components that may be included with a computer system.

Turning now to FIGS. 7-8, these figures illustrate example flowcharts includes series of acts for selectively live-migrating virtual machines between server devices of a cloud computing system 101. While FIGS. 7-8 illustrate acts according to one or more embodiments, alternative embodiments may omit, add to, reorder, and/or modify any of the acts shown in FIGS. 7-8. The acts of FIGS. 7-8 can be performed as part of a method. Alternatively, a non-transitory computer readable medium can comprise instructions that, when executed by one or more processors, cause a server device to perform the acts of FIGS. 7-8. In still further embodiments, a system can perform the acts of FIGS. 7-8.

For example, the series of acts 700 includes an act 720 of identifying a plurality of computing containers or virtual machines on a cloud computing system. For example, the act 720 can include identifying a plurality of virtual machines on a plurality of server devices.

The series of acts 700 can further include an act 740 of evaluating virtual machine characteristics to determine a plurality of impact scores for the plurality of virtual machines. For example, the act 740 can include evaluating virtual machine characteristics of the plurality of virtual machines to determine a plurality of impact scores for the plurality of virtual machines where the plurality of impact scores includes indications of predicted impact of live-migrating the plurality of virtual machines.

In one or more embodiments, evaluating the virtual machine characteristics of the plurality of virtual machines to determine a plurality of impact scores includes applying a prediction engine to the plurality of virtual machines where the prediction engine is trained to determine impact scores for virtual machines based on associated virtual machine characteristics.

For example, applying the prediction engine to the plurality of virtual machines may include applying a blackout prediction engine trained to predict an estimated blackout time for migrating a given virtual machine based on a set of virtual machine characteristics for the given virtual machine where the estimated blackout time includes an estimated duration of time that the virtual machine will not execute any codes or instructions or that the client device will be disconnected from accessing the given virtual machine. Applying the prediction engine to determine impact scores can further include determining the plurality of impact scores based on predicted blackout times for the plurality of virtual machines.

As another example, applying the prediction engine to the plurality of virtual machines may include applying a brownout prediction engine trained to predict an estimated brownout time for migrating a given data contained based on a set of virtual machine characteristics for the given virtual machine where the estimated brownout time includes an estimated duration of time that the given data container will provide limited performance. Applying the prediction engine to determine impact scores can further include determining the plurality of impact scores based on predicted brownout times for the plurality of virtual machines.

As another example, applying the prediction engine to the plurality of virtual machines may include determining impact sensitivity for the plurality of virtual machines where impact sensitivity for a given virtual machine includes an indication of sensitivity of the given virtual machine is to an interruption of a connection between a client device and the given virtual machine.

In one or more embodiments, the prediction engine can be trained to predict an impact score associated with live-migrating container by determining two or more impact sub-scores for the given virtual machine. The two or more impact sub-scores may include two or more of: a first predicted impact sub-score associated with a predicted blackout time where the blackout time includes an estimated duration of time that the given virtual machine will not execute any codes or instructions or that the client device will be disconnected from accessing the given virtual machine, a second predicted impact sub-score associated with a predicted brownout time where the predicted brownout time includes an estimated duration of time that the client device will have limited access to the given virtual machine, a third predicted impact sub-score associated with an impact sensitivity where the impact sensitivity includes an indication of how sensitive the given virtual machine is to an interruption of a connection between a client device and the given virtual machine, and a fourth predicted impact sub-score associated with a lifetime of the virtual machine where the lifetime of the virtual machine includes an indication of when the virtual machine is expected to expire. The prediction engine may further be trained to combine the two or more predicted impact sub-scores to determine the impact score associated with live-migrating the given virtual machine.

The series of acts 700 can further include an act 760 of identifying a candidate virtual machine for live-migration based on an impact score for the candidate virtual machine. For example, the act 760 can include identifying a candidate virtual machine for live-migration from the plurality of virtual machines based on an impact score from the plurality of impact scores corresponding to the virtual machine. Identifying the candidate virtual machine for live-migration may include identifying the candidate virtual machine based on a determination that the impact score corresponding to the virtual machine is less than an additional impact score corresponding to an additional virtual machine from the plurality of virtual machines.

The series of acts 700 further includes an act 780 of initiating live-migration of the candidate virtual machine. For example, the act 780 can include initiating live-migration of the candidate virtual machine to a destination server device. In one or more embodiments, the series of acts 700 further includes identifying a threshold impact score. The series of acts 700 can further include initiating live-migration of the candidate virtual machine to the destination server device based on determining that the impact score for the candidate node is less than the threshold impact score.

The series of acts 800 shown in FIG. 8 includes an act 820 of identifying a plurality of server devices including a plurality of virtual machines. For example, the act 820 can include identifying a plurality of server devices including a plurality of virtual machines.

The series of acts 800 can further include an act 840 of evaluating virtual machine characteristics to determine a plurality of impact scores associated with live-migrating the plurality of virtual machines. For example, the act 840 may include evaluating virtual machine characteristics of the plurality of virtual machines to determine a plurality of impact scores associated with live-migrating the plurality of virtual machines where an impact score of a virtual machine comprises an indication of a predicted impact of live-migrating the virtual machine.

In one or more embodiments, applying the prediction engine to the virtual machines includes applying a blackout prediction model trained to predict a range of blackout times from a plurality of ranges of blackout times based on a set of virtual machine characteristics for a given virtual machine where the plurality of ranges of blackout times including ranges of durations of time that the given virtual machine will not execute any codes or instructions or that the client device is predicted to be disconnected from the given virtual machine. The plurality of ranges of blackout times may include ranges of durations on a log linear scale.

In one or more embodiments, applying the prediction engine to the virtual machines includes applying a blackout prediction model trained to predict a range of blackout times from a plurality of ranges of blackout times based on a set of virtual machine characteristics for a given virtual machine where the plurality of ranges of blackout times include ranges of durations of time that a client device is predicted to be disconnected from the given virtual machine. The plurality of ranges of brownout times may include ranges of durations on a log linear scale.

The series of acts 800 can further include an act 860 of identifying a candidate server device from the plurality of server devices based the plurality of impact scores. For example, the act 860 may include identifying a candidate server device from the plurality of server devices based on one or more impact scores for one or more virtual machines from the plurality of virtual machines on the candidate server. In one or more embodiments, identifying the candidate server device includes determining a combined impact score for the candidate server device based on a combination of the one or more impact scores for the one or more virtual machines on the candidate server. Identifying the candidate server may further include determining that the combined impact score for the candidate server device is less than one or more combined impact scores for one or more additional server devices from the plurality of server devices.

The series of acts 800 can further include an act 880 of initiating live-migration of the one or more virtual machines from the candidate server device. For example, the act 880 may include initiating live-migration of the one or more virtual machines from the candidate server device to a destination server device. The series of acts 800 can further include determining that the one or more impact scores for the one or more virtual machines from the plurality of virtual machines is less than a threshold impact score. The series of acts 800 can additionally include initiating live-migration of the one or more virtual machines based determining that the one or more impact scores for the one or more virtual machines from the plurality of virtual machines is less than a threshold impact score. In one or more embodiments, the threshold impact score is based on a number of empty server devices from the plurality of server devices.

While one or more embodiments described herein relate specifically to systems, methods, and computer-readable media for live-migrating virtual machines or computing containers between server nodes, similar features and functionality can relate to more generally live-migrating virtual services between nodes of the cloud computing system. For example, the acts discussed in connection with FIGS. 7 and 8 may involve identifying virtual services including virtual machines and/or computing containers, evaluating characteristics of the virtual services to determine impact scores (e.g., including applying a prediction engine to the virtual services), identifying candidate virtual service(s) for live-migration based on the impact scores, and initiating live-migration of the candidate virtual service(s) in accordance with one or more embodiments described herein.

Figure 9:
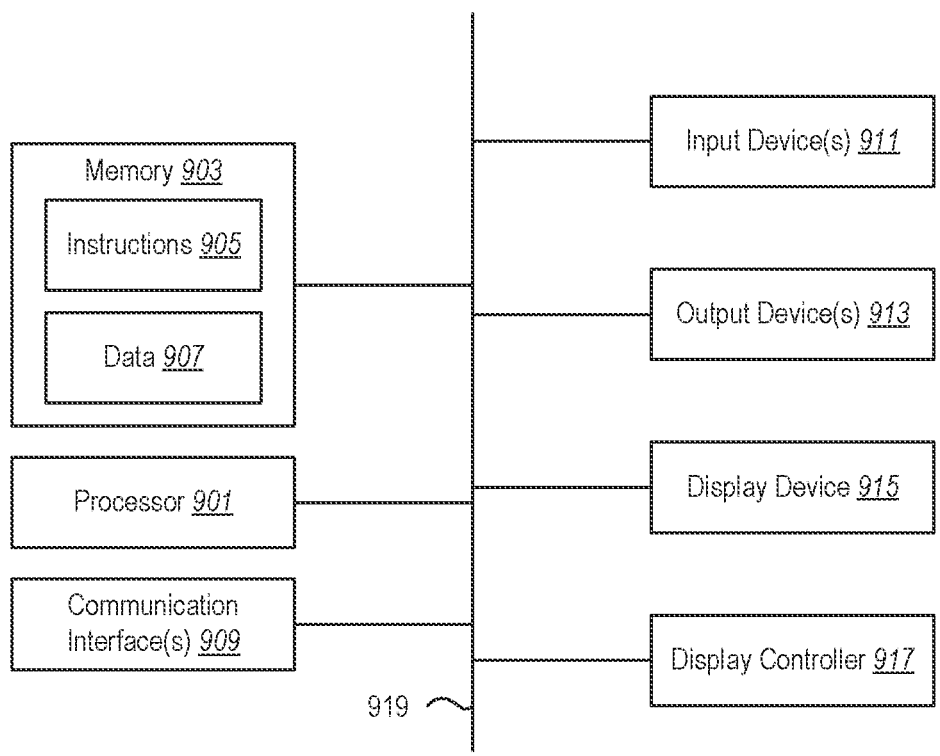
FIG. 9 illustrates certain components that may be included within a computer system.

FIG. 9 illustrates certain components that may be included within a computer system 900. One or more computer systems 900 may be used to implement the various devices, components, and systems described herein.

The computer system 900 includes a processor 901. The processor 901 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 901 may be referred to as a central processing unit (CPU). Although just a single processor 901 is shown in the computer system 900 of FIG. 9, in an alternative configuration, a combination of processors (e.g., an ARM and DSP) could be used.

The computer system 900 also includes memory 903 in electronic communication with the processor 901. The memory 903 may be any electronic component capable of storing electronic information. For example, the memory 903 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 905 and data 907 may be stored in the memory 903. The instructions 905 may be executable by the processor 901 to implement some or all of the functionality disclosed herein. Executing the instructions 905 may involve the use of the data 907 that is stored in the memory 903. Any of the various examples of modules and components described herein may be implemented, partially or wholly, as instructions 905 stored in memory 903 and executed by the processor 901. Any of the various examples of data described herein may be among the data 907 that is stored in memory 903 and used during execution of the instructions 905 by the processor 901.

A computer system 900 may also include one or more communication interfaces 909 for communicating with other electronic devices. The communication interface(s) 909 may be based on wired communication technology, wireless communication technology, or both. Some examples of communication interfaces 909 include a Universal Serial Bus (USB), an Ethernet adapter, a wireless adapter that operates in accordance with an Institute of Electrical and Electronics Engineers (IEEE) 802.11 wireless communication protocol, a Bluetooth wireless communication adapter, and an infrared (IR) communication port.

A computer system 900 may also include one or more input devices 911 and one or more output devices 913. Some examples of input devices 911 include a keyboard, mouse, microphone, remote control device, button, joystick, trackball, touchpad, and lightpen. Some examples of output devices 913 include a speaker and a printer. One specific type of output device that is typically included in a computer system 900 is a display device 915. Display devices 915 used with embodiments disclosed herein may utilize any suitable image projection technology, such as liquid crystal display (LCD), light-emitting diode (LED), gas plasma, electroluminescence, or the like. A display controller 917 may also be provided, for converting data 907 stored in the memory 903 into text, graphics, and/or moving images (as appropriate) shown on the display device 915.

The various components of the computer system 900 may be coupled together by one or more buses, which may include a power bus, a control signal bus, a status signal bus, a data bus, etc. For the sake of clarity, the various buses are illustrated in FIG. 9 as a bus system 919.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for live-migrating virtual services between server nodes, comprising:

determining impact scores for a plurality of virtual machines on a cloud computing system, wherein determining the impact scores includes, for each virtual machine from the plurality of virtual machines, determining an impact score indicating a predicted impact of live-migrating a virtual machine based on one or more behavior characteristics of the virtual machine, the one or more behavior characteristics of the virtual machine including a sensitivity of the virtual machine to an estimated brownout time of live-migrating the virtual machine, the estimated brownout time indicating an estimated duration of time in which the virtual machine will experience a limited connection while live-migrating the virtual machine to a destination server device, wherein the estimated brownout time is determined to fall within a first brownout time range of a plurality of estimated brownout time ranges, and wherein the impact score is based on the sensitivity of the virtual machine to the first brownout time range;

identifying candidate virtual machines for live-migration based on a policy of the cloud computing system associated with increasing availability of computing resources on server devices of the cloud computing system, wherein identifying the candidate virtual machines includes identifying a subset of virtual machines from the plurality of virtual machines based on associated impact scores for the subset of virtual machines being less than impact scores for other virtual machines from the plurality of virtual machines; and initiating live-migration of the candidate virtual machines to the destination server device.

2. The method of claim 1, wherein the one or more behavior characteristics includes characteristics of an application running on the virtual machine and an associated level of tolerance of the application to a brownout event of the estimated brownout time.

3. The method of claim 1, wherein determining the impact score for each virtual machine from the plurality of virtual machines includes:

applying a brownout prediction engine to the plurality of virtual machines, wherein the brownout prediction engine is a machine learning model trained to predict an estimated brownout time for live-migrating each virtual machine from the plurality of virtual machines, wherein the estimated brownout time includes the estimated duration of time that a virtual machine will experience the limited connection while still maintaining a level of client access to the virtual machine.

4. The method of claim 1, wherein determining the impact score for each virtual machine from the plurality of virtual machines includes:

identifying lifetimes of the plurality of virtual machines, the lifetimes including indications of when the plurality of virtual machines are expected to expire; and wherein determining the impact score for the virtual machine is further based on an associated lifetime of the virtual machine.

5. The method of claim 4, wherein identifying lifetimes of the plurality of virtual machines includes identifying times at which one or more of the virtual machines are scheduled to expire.

6. The method of claim 4, wherein determining the impact score for the virtual machine includes:

comparing the associated lifetime to a time when the virtual machine would be scheduled for live-migration; and determining the impact score for the virtual machine based on comparing the associated lifetime to the time when the virtual machine would be scheduled for live-migration.

7. The method of claim 6, wherein determining the impact score includes:

if the associated lifetime is predicted to expire earlier than the time when the virtual machine would be scheduled for live-migration, associating the virtual machine with a first impact score; and if the associated lifetime is predicted to expire later than the time when the virtual machine would be schedule for live-migration, associating the virtual machine with a second impact score.

8. The method of claim 7, wherein the first impact score is greater than the second impact score based on the associated lifetime being earlier than the time when the virtual machine would be scheduled for live-migration.

9. The method of claim 1, wherein determining the impact score for each virtual machine includes:

identifying a time at which a virtual machine would be scheduled for live-migration; and determining, based on the daily or weekly utilization pattern, the impact score based on a predicted utilization for the virtual machine at the time when the virtual machine would be scheduled for live-migration.

10. The method of claim 1, wherein the one or more behavior characteristics further includes:

characteristics of an application running on the virtual machine;

a lifetime of the virtual machine, the lifetime including an indication of when the virtual machine is expected to expire; and a daily or weekly utilization pattern for the virtual machine.

11. A system for live-migrating virtual services between server nodes, comprising:

one or more processors;

memory in electronic communication with the one or more processors; and instructions stored in the memory, the instructions being executable by the one or more processors to:

determine impact scores for a plurality of virtual machines on a cloud computing system, wherein determining the impact scores includes, for each virtual machine from the plurality of virtual machines, determining an impact score indicating a predicted impact of live-migrating a virtual machine based on one or more behavior characteristics of the virtual machine, the one or more behavior characteristics of the virtual machine including a sensitivity of the virtual machine to an estimated brownout time of live-migrating the virtual machine, the estimated brownout time indicating an estimated duration of time in which the virtual machine will experience a limited connection while live-migrating the virtual machine to a destination server device;

identify candidate virtual machines for live-migration based on a policy of the cloud computing system associated with increasing availability of computing resources on server devices of the cloud computing system, wherein identifying the candidate virtual machines includes identifying a subset of virtual machines from the plurality of virtual machines based on associated impact scores for the subset of virtual machines being less than impact scores for other virtual machines from the plurality of virtual machines, wherein the sensitivity of the virtual machine to the estimated brownout time is based on a type of application hosted by the virtual machine and an associated level of tolerance of the type of application to a brownout event of the estimated brownout time; and initiate live-migration of the candidate virtual machines to the destination server device.

12. The system of claim 11, wherein the one or more behavior characteristics further includes:

characteristics of an application running on the virtual machine;

a lifetime of the virtual machine, the lifetime including an indication of when the virtual machine is expected to expire; and a daily or weekly utilization pattern for the virtual machine.

13. The system of claim 11, wherein determining the impact score for each virtual machine from the plurality of virtual machines includes:

applying a brownout prediction engine to the plurality of virtual machines, wherein the brownout prediction engine is a machine learning model trained to predict an estimated brownout time for live-migrating each virtual machine from the plurality of virtual machines, wherein the estimated brownout time includes the estimated duration of time that a virtual machine will experience the limited connection while still maintaining a level of client access to the virtual machine.

14. The system of claim 11, wherein determining the impact score for each virtual machine from the plurality of virtual machines includes:
identifying lifetimes of the plurality of virtual machines, the lifetimes including indications of when the plurality of virtual machines are expected to expire; and
wherein determining the impact score for the virtual machine is based on an associated lifetime of the virtual machine.

15. The system of claim 14, wherein determining the impact score for the virtual machine includes:
comparing the associated lifetime to a time when the virtual machine would be scheduled for live-migration; and
determining the impact score for the virtual machine based on comparing the associated lifetime to the time when the virtual machine would be scheduled for live-migration.

16. The system of claim 15, wherein determining the impact score includes:
if the associated lifetime is predicted to expire earlier than the time when the virtual machine would be scheduled for live-migration, associating the virtual machine with a first impact score; and
if the associated lifetime is predicted to expire later than the time when the virtual machine would be schedule for live-migration, associating the virtual machine with a second impact score, wherein the first impact score is greater than the second impact score.

17. The system of claim 11, wherein the one or more behavior characteristics includes one or more of a daily or weekly utilization pattern for the virtual machine.

18. The system of claim 17, wherein determining the impact score for each virtual machine includes:
identifying a time at which a virtual machine would be scheduled for live-migration; and
determining, based on the daily or weekly utilization pattern, the impact score based on a predicted utilization for the virtual machine at the time when the virtual machine would be scheduled for live-migration.

* * * * *